(12) United States Patent
Ohmura et al.

(10) Patent No.: US 10,899,354 B2
(45) Date of Patent: Jan. 26, 2021

(54) CONTROL METHOD FOR VEHICLE AIR CONDITIONING, AND VEHICLE AIR CONDITIONING DEVICE

(71) Applicant: Nissan Motor Co., Ltd., Yokohama (JP)

(72) Inventors: Yasushi Ohmura, Kanagawa (JP); Masahiro Oomori, Kanagawa (JP); Nobuto Morishima, Kanagawa (JP); Seiji Katsuma, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/606,254

(22) PCT Filed: May 16, 2017

(86) PCT No.: PCT/JP2017/018292
§ 371 (c)(1),
(2) Date: Oct. 18, 2019

(87) PCT Pub. No.: WO2018/211581
PCT Pub. Date: Nov. 22, 2018

(65) Prior Publication Data
US 2020/0398851 A1  Dec. 24, 2020

(51) Int. Cl.
*B60W 30/18* (2012.01)
*B60H 1/00* (2006.01)
(Continued)

(52) U.S. Cl.
CPC ... *B60W 30/18181* (2013.01); *B60H 1/00642* (2013.01); *B60T 13/52* (2013.01);
(Continued)

(58) Field of Classification Search
CPC .......... B60W 30/18181; B60W 10/06; B60W 10/30; B60W 2555/20; B60W 2510/06; B60H 1/00642; B60T 13/52
See application file for complete search history.

(56) References Cited

U.S. PATENT DOCUMENTS

| | | | |
|---|---|---|---|
| 10,081,361 B2* | 9/2018 | Books | B60R 16/03 |
| 2016/0273468 A1* | 9/2016 | Kato | B60W 30/17 |

(Continued)

FOREIGN PATENT DOCUMENTS

| | | |
|---|---|---|
| CN | 102050099 A | 5/2011 |
| CN | 102050110 A | 5/2011 |

(Continued)

*Primary Examiner* — Peter D Nolan
*Assistant Examiner* — Wae L Louie
(74) *Attorney, Agent, or Firm* — Global IP Counselors, LLP

(57) ABSTRACT

A vehicle air-conditioning device is provided for controlling a vehicle air-conditioning of a vehicle in accordance with a control method. A negative pressure, which is generated in an intake passage of the internal combustion engine by a vacuum servo that assists a brake pedal force, is estimated based on an atmospheric pressure and a pressure inside the intake passage. When a predetermined condition is established that includes a state in which the estimated negative pressure inside the vacuum servo is insufficient relative to a predetermined pressure during operation of the air-conditioning compressor, the air-conditioning compressor is stopped during a first time period, the air-conditioning compressor is operated during a second time period regardless of the predetermined condition after the first time period has elapsed, and operation of the air-conditioning compressor is controlled in accordance the states of the predetermined condition being established after the second time period has elapsed.

3 Claims, 3 Drawing Sheets

(51) Int. Cl.
*B60W 10/30* (2006.01)
*B60W 10/06* (2006.01)
*B60W 10/18* (2012.01)
*B60T 13/52* (2006.01)

(52) U.S. Cl.
CPC ............ *B60W 10/06* (2013.01); *B60W 10/18* (2013.01); *B60W 10/30* (2013.01); *B60W 2510/06* (2013.01); *B60W 2540/12* (2013.01); *B60W 2555/20* (2020.02)

(56) References Cited

U.S. PATENT DOCUMENTS

| | | | |
|---|---|---|---|
| 2016/0297415 A1* | 10/2016 | Kato | F02D 41/065 |
| 2018/0222468 A1* | 8/2018 | Yamazaki | B60K 6/54 |
| 2018/0244131 A1* | 8/2018 | Iwamoto | F02N 11/0833 |
| 2019/0293031 A1* | 9/2019 | Dudar | F01N 3/10 |
| 2019/0360434 A1* | 11/2019 | Dudar | F02D 41/0032 |

FOREIGN PATENT DOCUMENTS

| | | |
|---|---|---|
| CN | 103350693 A | 10/2013 |
| CN | 103921648 A | 7/2014 |
| JP | H9-144573 A | 6/1997 |
| JP | 2003-104046 A | 4/2003 |
| JP | 2003-276416 A | 9/2003 |
| JP | 2013-203120 A | 10/2013 |
| JP | 2014-136468 A | 7/2014 |
| JP | 2015-47884 A | 3/2015 |

\* cited by examiner

CONTROL METHOD FOR VEHICLE AIR CONDITIONING, AND VEHICLE AIR CONDITIONING DEVICE

CROSS-REFERENCE TO RELATED APPLICATIONS

This application is a U.S. national stage application of International Application No. PCT/JP2017/018292, filed on May 16, 2017.

BACKGROUND

Technical Field

The present invention relates to a control method for controlling air conditioning of a vehicle provided with an air-conditioning compressor, and to a vehicle air-conditioning device for a vehicle.

Background Information

A vehicle is disclosed in Japanese Laid-Open Patent Application No. 2014-136468 (Patent Citation 1) that has an air-conditioning compressor driven by an engine which is an internal combustion engine, and a vacuum servo in which negative pressure of an intake manifold of the engine is used to assist brake pedal force. Patent Citation 1 further discloses a technology in which when the negative pressure inside the vacuum servo is insufficient, the start of vehicle movement is a trigger to stop air conditioning for a predetermined amount of time, an engine load allotted to the air-conditioning compressor is reduced, and the negative pressure inside the vacuum servo is ensured.

SUMMARY

However, with the technology of Patent Citation 1, when the brake pedal is repeatedly operated while the vehicle is traveling at a low speed due to, for example, a traffic jam, etc., the start of the vehicle movement cannot be detected, and there is therefore a risk that the air conditioning will not stop and the negative pressure inside the vacuum servo will be insufficient.

An object of the present invention is to provide a method for controlling air conditioning for a vehicle and an air-conditioning device for a vehicle, with which air-conditioning functionality and brake performance can both be achieved.

To achieve the object described above, in the present invention, negative pressure inside a vacuum servo is estimated based on pressure inside an intake passage of an internal combustion engine and atmospheric pressure, an air-conditioning compressor is stopped for a first time period when a predetermined condition is established that includes a state in which the estimated negative pressure inside the vacuum servo is insufficient relative to a predetermined pressure during operation of the air-conditioning compressor, the air-conditioning compressor is operated for a second time period regardless of the predetermined condition after the first time period has elapsed, and the operation of the air-conditioning compressor is controlled in accordance with the state of the predetermined condition being established after the second time period has elapsed.

Consequently, when the predetermined condition has been established, negative pressure inside the vacuum servo can be ensured by stopping the air-conditioning compressor for a first time period. After the first time period has elapsed, the air-conditioning compressor is operated for a second time period regardless of the predetermined condition, and air-conditioning performance can therefore be ensured. After the second time period has elapsed, the air-conditioning compressor again stops for the first time period if the predetermined condition is established, and negative pressure inside the vacuum servo can therefore be ensured even if a brake pedal is repeatedly operated while the vehicle is traveling at a low speed. A vacuum servo negative pressure sensor is rendered unnecessary and costs can be reduced by estimating the negative pressure inside the vacuum servo.

DETAILED DESCRIPTION OF THE EMBODIMENTS

Preferred embodiments for implementing an air-conditioning control process of the present invention will be described hereinbelow based on drawings.

First Embodiment

Figure 1:
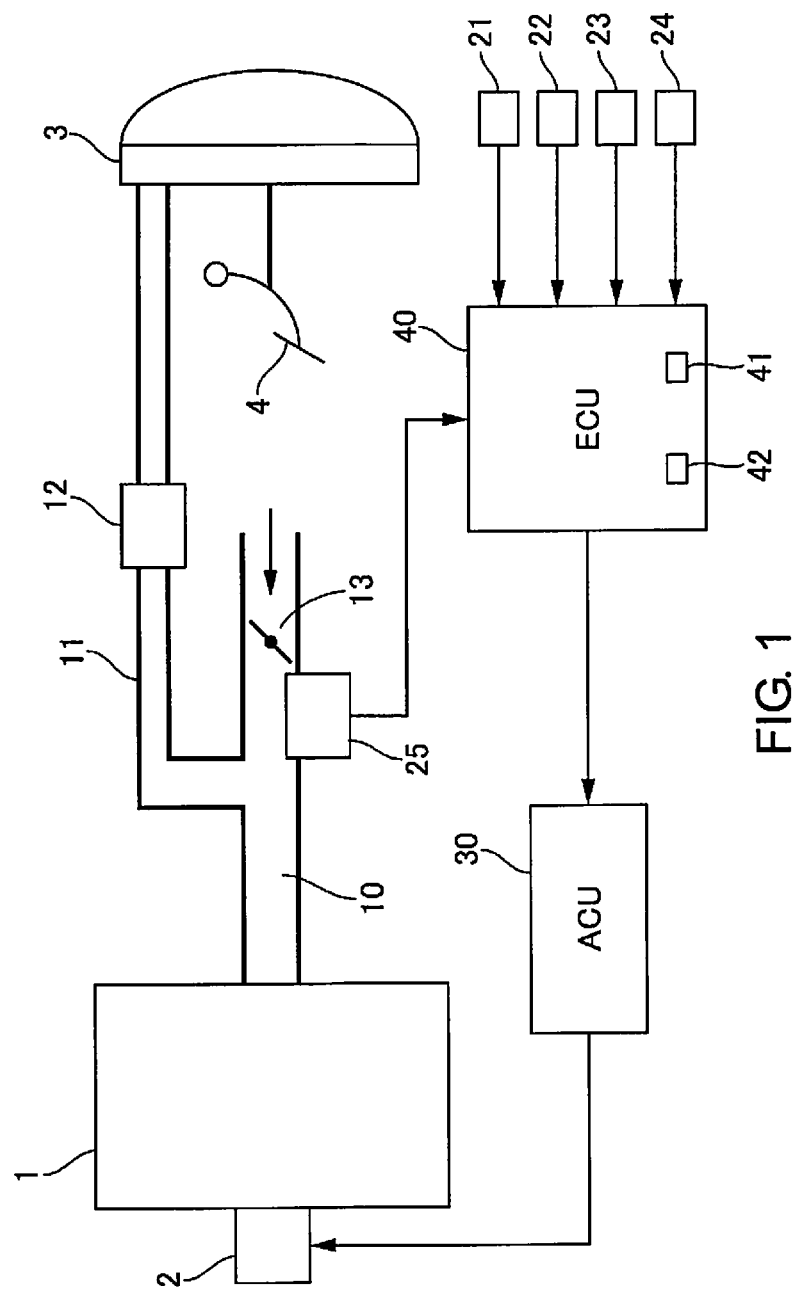
FIG. 1 is a system diagram of a vehicle to which an air-conditioning device for a vehicle of a first embodiment is applied.

FIG. 1 is a system diagram of a vehicle to which a vehicle air-conditioning device for a vehicle of the first embodiment is applied. An engine 1, which is an internal combustion engine, takes in air from an intake manifold 10. The intake manifold 10 is provided with a throttle valve 13, which controls the amount of air taken in. A negative pressure supply passage 11 is connected to the intake manifold 10 between the throttle valve 13 and the engine 1, and an intake pressure sensor 25 is provided. The intake pressure sensor 25 detects negative pressure inside the intake manifold 10 (written hereinafter as PIM), and outputs the detected pressure to an engine control unit 40 (described hereinafter). The negative pressure supply passage 11 is connected to a vacuum servo 3.

The vacuum servo 3 is a negative pressure booster that assists a stepping force that is applied to a brake pedal 4 by introducing negative pressure into a pressure chamber. A check valve 12 is provided over the negative pressure supply passage 11, and this check valve both allows air to flow from the vacuum servo 3 toward the engine 1 and prevents air from flowing from the engine 1 toward the vacuum servo 3.

When the engine 1 rotates, air is taken in from the intake manifold 10 by reciprocating motion of a piston; therefore, negative pressure is generated inside the intake manifold 10, and negative pressure inside the vacuum servo 3 is supplied. The vacuum servo 3 uses this negative pressure to assist the stepping force applied to the brake pedal 4. When a speed of the engine 1 decreases, negative pressure inside the intake manifold 10 is not generated, and the supply of negative pressure to the vacuum servo 3 is insufficient. When the brake pedal 4 is operated multiple times in this state, the negative pressure inside the vacuum servo 3 is consumed, and assisting force is insufficient. The magnitude of the negative pressure is described hereinafter as a relationship that is the same as that of the magnitude of pressure in terms of the absolute value thereof.

This air-conditioning device for a vehicle (also referred to hereinafter as "air conditioner") constitutes a vapor-compression refrigerant cycle provided not only with a well-known compressor 2, but also with a condenser, an expansion valve, an evaporator, etc. The compressor 2 of the air conditioner is driven by the engine 1. Consequently, when the compressor 2 is operated, an engine load increases, the negative pressure inside the intake manifold 10 decreases, and the negative pressure that can be supplied to the vacuum servo 3 therefore also decreases.

The engine control unit 40 (referred to hereinafter as the ECU) calculates a target engine torque based on a requested torque Td corresponding to an acceleration pedal position APO. When the acceleration pedal position APO is less than a predetermined value, a position of the throttle valve 13 is controlled so that the valve is open by only a very small amount, and an idling state is achieved. The ECU is equipped with an atmospheric pressure sensor 41 that detects atmospheric pressure (also referred to hereinafter as POP). A brake switch 21 outputs an ON signal to the ECU when the brake pedal 4 is operated. An air conditioner switch 22 outputs an ON signal to the ECU when a driver desires the air conditioner to operate. A vehicle speed sensor 23 detects a vehicle speed VSP and outputs the detected value to the ECU. An accelerator position sensor 24 detects the driver's acceleration pedal position APO and outputs the detected value to the ECU.

The ECU controls the throttle valve 13 of the engine 1 and an injector, and also controls a running state of the engine 1 and an operating state of the compressor 2. The ECU has a negative pressure estimation unit 42 that estimates a vacuum servo negative pressure estimation value (referred to hereinafter also as the PMB*), which is the negative pressure inside the vacuum servo 3, based on the PIM and the POP. This makes installing a vacuum servo negative pressure sensor unnecessary.

An air conditioner control unit 30 (referred to hereinafter as the ACU) is a control device that performs air-conditioning control for a cabin interior. The ACU sends and receives various signals to and from the ECU, and controls the operating state of the compressor 2 based on the ON and OFF commands for the operation of the compressor 2 directed from the ECU. Within the ACU, a discharge capacity, etc., of the compressor 2 is controlled so that a set cabin interior temperature set by an occupant, etc., is reached.

Air-Conditioning Control During Brake Negative Pressure Request

Problems with a vehicle provided with the system of the first embodiment shall now be described. Concerning detection of negative pressure inside the vacuum servo 3, when a sensor that directly detects the negative pressure inside the vacuum servo 3 is provided instead of the negative pressure estimation unit 42 of the first embodiment, the air conditioner is stopped at the point in time when a negative pressure deficit is detected, and the air conditioner is preferably operated after negative pressure has been ensured. However, when a sensor that detects pressure directly is not provided and the negative pressure inside the vacuum servo 3 is estimated from the pressure inside the intake manifold 10 and the atmospheric pressure, highly precise estimation is difficult. This is because the check valve 12 is provided between the intake manifold 10 and the vacuum servo 3 and the same pressure state is not always maintained. Consequently, there is some divergence between the negative pressure estimation value and the actual negative pressure.

In view of this, when the estimation value of the negative pressure inside the vacuum servo 3 falls below a predetermined value, the air conditioner can be stopped via timer management for a time period during which negative pressure can be reliably ensured. When there are too many scenarios in which the air conditioner stops, there is a risk that air-conditioning performance will decrease and the occupants will experience discomfort. In view of this, after the air conditioner has been stopped by timer management, the air conditioner is operated by timer management for a time period during which air-conditioning performance can be ensured. Specifically, even when the estimation value of the negative pressure inside the vacuum servo 3 has diverged from the actual negative pressure, both the negative pressure of the vacuum servo 3 and air-conditioning performance can be ensured by repeatedly stopping and operating the air conditioner based on timer management and in accordance with a predetermined condition. A control flow by which this effect is achieved is described below.

Air-Conditioning Control Process During Brake Negative Pressure Request

Figure 2:
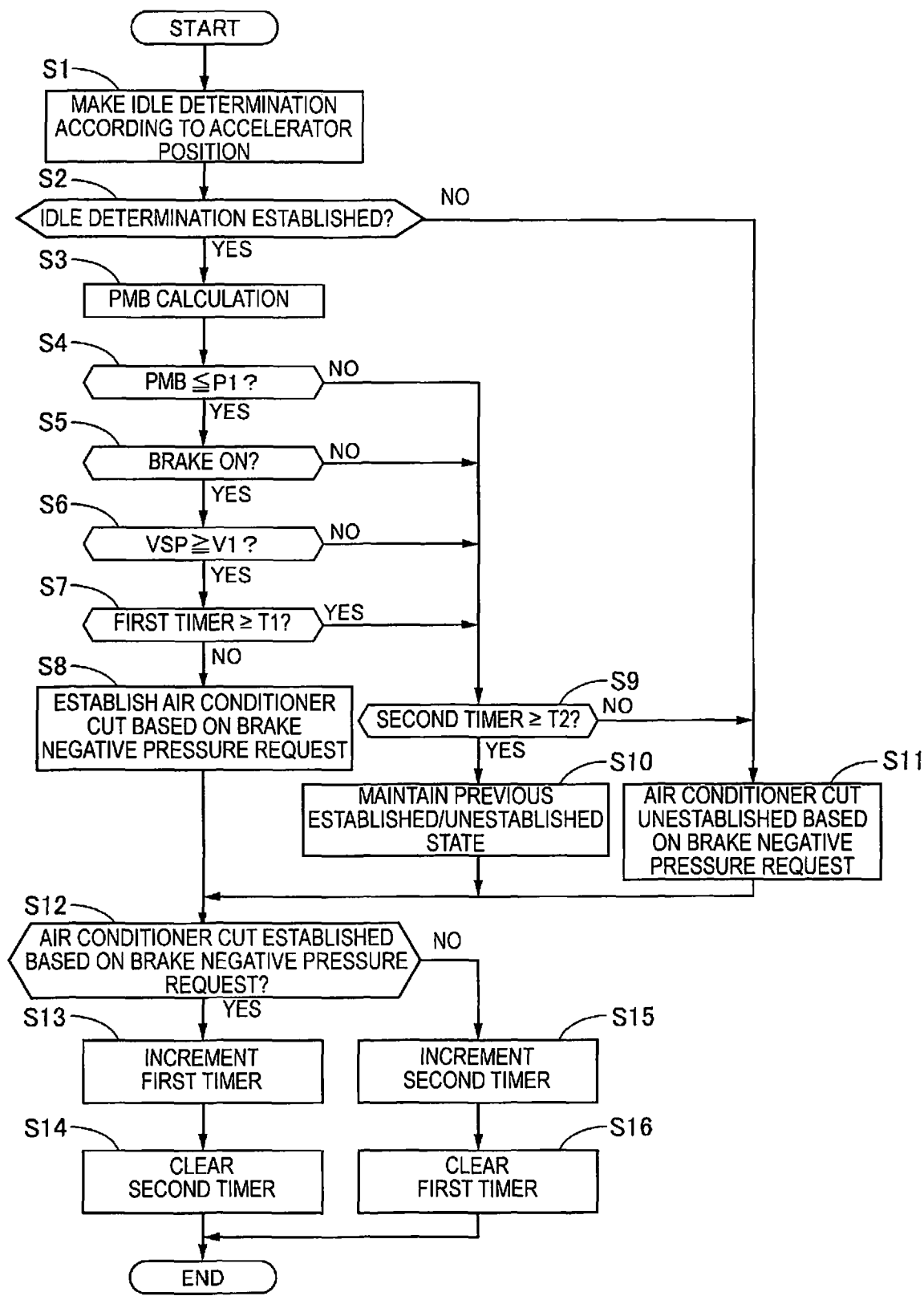
FIG. 2 is a flowchart showing an air-conditioning control process during a brake negative pressure request in the air-conditioning device for a vehicle of the first embodiment.

FIG. 2 is a flowchart showing an air-conditioning control process during a brake negative pressure request in the air-conditioning device for a vehicle of the first embodiment.

In step S1, an idle determination is made according to the acceleration pedal position APO. Specifically, when the APO is less than a predetermined value that indicates that the pedal is not being pressed, an idling state of the engine 1 is determined to be established.

In step S2, an assessment is made as to whether or not an idle determination is established; when an idle determination is established, the process advances to step S3, and otherwise the process advances to step S11.

In step S3, the PMB* is calculated by the negative pressure estimation unit 42. Specifically, the PMB* is calculated based on a difference obtained from subtracting the atmospheric pressure POP from the PIM detected by the intake pressure sensor 25. An adjusted gain, etc., may be set to perform this calculation; no particular limitation is provided.

In step S4, an assessment is made as to whether or not the vacuum servo negative pressure estimation value PMB* is equal to or less than a predetermined value P1; when the value PMB* is equal to or less than the predetermined value P1, the process advances to step S5, and when the value PMB* is greater than the predetermined value P1, the process advances to step S9. The predetermined value P1 is a value at which the negative pressure inside the vacuum servo 3 can sufficiently generate assist force. In other words, when the value PMB* is equal to or less than the predetermined value P1, it is not possible to ensure that the negative pressure inside the vacuum servo 3 can generate assist force.

In step S5, an assessment is made as to whether or not the brake switch 21 is ON; when the switch is ON, the process advances to step S6, and when the switch is OFF, the process advances to step S9. Specifically, this is because when the brake switch 21 is ON, the PMB* tends to decrease, and when the brake switch 21 is OFF, the PMB* is held steady.

In step S6, an assessment is made as to whether or not the vehicle speed VSP is equal to or greater than a predetermined vehicle speed V1; when the vehicle speed is less than V1, the process advances to step S9. The predetermined vehicle speed V1 is a value indicating that the vehicle is moving. In other words, when the vehicle speed is less than V1, the vehicle is essentially in a stopped state and a negative pressure deficit is not a particular concern. When the vehicle speed is equal to or greater than V1, this indicates that the vehicle is in a traveling state and negative pressure must be ensured.

In step S7, an assessment is made as to whether or not a first timer is equal to or greater than a first predetermined time T1; when the first timer is equal to or greater than T1, the process advances to step S9, and when the first timer is less than T1, the process advances to step S8. The first timer is a timer incremented when an air conditioner cut condition, based on a brake negative pressure request (described hereinafter), is established. The first predetermined time T1 is a time needed for the lacking negative pressure to be ensured.

In step S8, an air conditioner cut condition based on the brake negative pressure request is established. Specifically, this indicates that along with the deficit in the brake negative pressure, the air conditioner is stopped and the load of the compressor 2 on the engine 1 is reduced, whereby a condition for ensuring negative pressure is established.

In step S9, an assessment is made as to whether or not a second timer is equal to or greater than a second predetermined time T2; when the second timer is equal to or greater than T2, the process advances to step S10, and when the second timer is less than T2, the process advances to step S11. The second timer is a timer incremented when the air conditioner cut condition, based on the brake negative pressure request, is not established. The second predetermined time T2 is a time needed for the performance of the air conditioner to be ensured; e.g., a time that within the cabin during summertime, is needed to reduce a cabin interior temperature towards a set temperature to some extent.

In step S10, the previous state of the air conditioner cut condition is maintained. When the air conditioner cut condition has been established, the established state is maintained, and when the condition is not established, the unestablished state is maintained.

In step S11, the air conditioner cut condition based on the brake negative pressure request is in an unestablished state.

In step S12, an assessment is made as to whether or not the air conditioner cut condition has been established; when the condition has been established, the process advances to step S13, and when the condition is unestablished, the process advances to step S15.

In step S13, the first timer is incremented.

In step S14, the second timer is cleared.

In step S15, the second timer is incremented.

In step S16, the first timer is cleared.

Figure 3:
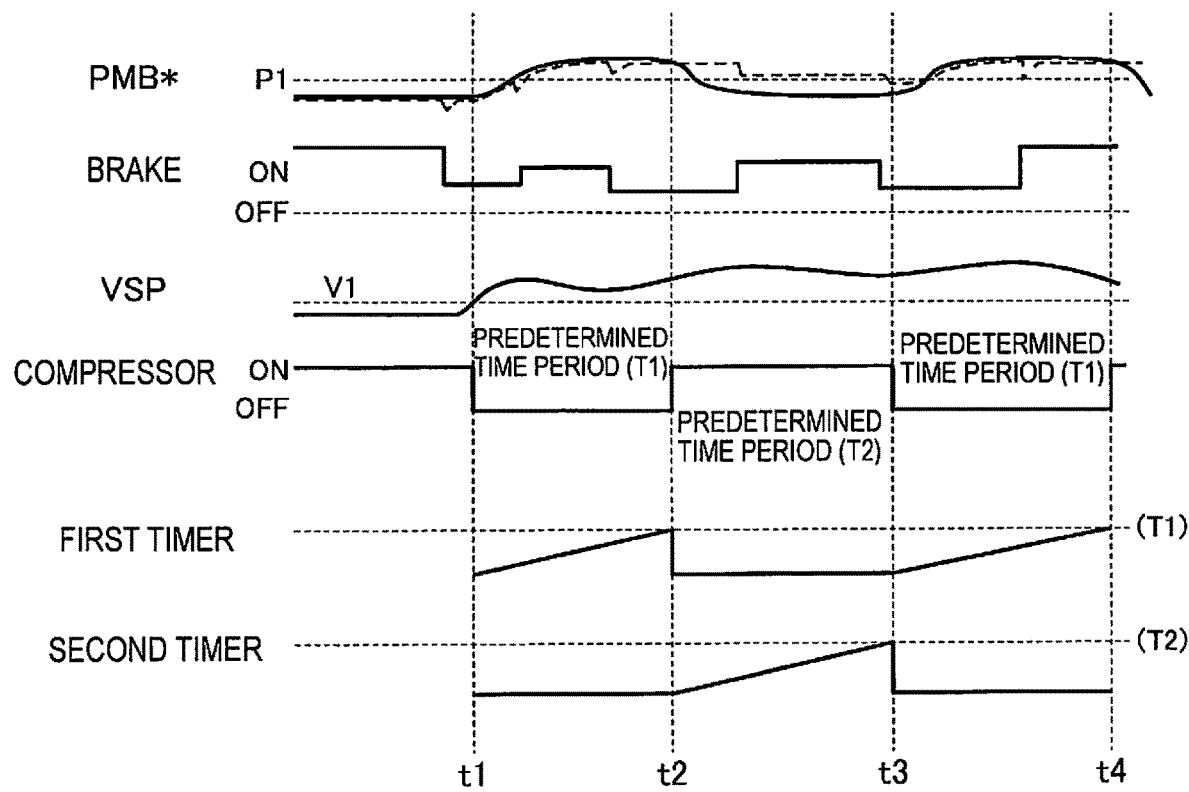
FIG. 3 is a time chart showing the air-conditioning control process during a brake negative pressure request in the air-conditioning device for a vehicle of the first embodiment.

FIG. 3 is a time chart showing the air-conditioning control process during a brake negative pressure request in the air-conditioning device for a vehicle of the first embodiment. This time chart begins when the driver has pressed the brake pedal 4, the vehicle is in a stopped state, the compressor 2 is turned ON by the operation of the air conditioner, and the vacuum servo negative pressure estimation value PMB* is equal to or less than the predetermined value P1. The dashed line denoted by PMB* is the actual negative pressure inside the vacuum servo 3.

When the driver operates the amount by which the brake pedal 4 is pressed and the vehicle begins to creep forward while the brake switch 21 remains ON and the engine 1 is idling, the vehicle speed VSP exceeds the predetermined vehicle speed V1 at time t1. Consequently, the air conditioner cut condition is established and incrementing of the first timer begins. While the first timer is being incremented, the load of the compressor 2 on the engine 1 is reduced due to the engine stopping, and PMB* begins to increase. During this time, PMB* can be ensured even if, for example, the brake pedal 4 is operated and the vehicle travels very slowly during a traffic jam, etc.

At time t2, when the first timer reaches the first predetermined time T1, the first timer is cleared. At this time, PMB* is a value greater than the predetermined value P1, and the air conditioner cut condition is therefore unestablished. Consequently, incrementing of the second timer is begun, the air conditioner is operated, and air-conditioning performance is ensured. The load of the compressor 2 is added to the load of the engine 1 and the brake pedal 4 continues to be operated; therefore, although PMB* decreases, when incrementing of the second timer is begun, the previous established state or unestablished state of the air conditioner cut condition is maintained until the second predetermined time T2 elapses. Consequently, the unestablished state of the air conditioner cut condition is maintained even if PMB* falls below the predetermined value P1 during the incrementing of the second timer. Consequently, air-conditioning performance can be ensured because the air conditioner continues to operate during the second predetermined time T2 after the second timer begins being incremented.

At time t3, when the second timer reaches the second predetermined time T2, the second timer is cleared. At this time, PMB* falls below the predetermined value P1, and the air conditioner cut condition is therefore established. Consequently, once again, similar to the time from t1 to t2, incrementing of the first timer is begun and the air conditioner is stopped. PMB* can thereby be ensured, the travel state therefore continues, and a negative pressure deficit can be avoided even if the brake pedal 4 is repeatedly operated.

As described above, in the first embodiment, the following effects are achieved.

(1) This air-conditioning device is provided with a compressor 2 (air-conditioning compressor 2) driven by an engine 1, and a negative pressure estimation unit 42 that, based on pressure inside an intake manifold 10 (intake passage) of the engine 1 and atmospheric pressure, estimates negative pressure inside a vacuum servo 3 that introduces negative pressure generated in the intake manifold 10 to assist the brake pedal force. When a predetermined condition is established, which includes a state in which the negative pressure inside the vacuum servo 3 is insufficient relative to a predetermined pressure while the compressor 2 is operating, the compressor 2 is stopped during a first predetermined time T1. After the first predetermined time T1 has elapsed, the compressor 2 is operated for a second predetermined time T2 (second time period) regardless of the predetermined condition, and after the second predetermined time T2 has elapsed, the operation of the compressor 2 is controlled in accordance with the state of the predetermined condition being established.

Specifically, during the first predetermined time T1, the negative pressure inside the vacuum servo 3 can be ensured by stopping the compressor 2. After the first predetermined time T1 has elapsed, the compressor 2 is operated during the second predetermined time T2 regardless of the predetermined condition, and air-conditioning performance can therefore be ensured. After the second predetermined time T2 has elapsed, if the predetermined condition is established, the compressor 2 once again stops during the first predetermined time T1, and negative pressure inside the vacuum servo 3 can therefore be ensured even if the brake pedal 4 is repeatedly operated while the vehicle is traveling at a low speed. Due to the negative pressure inside the vacuum servo being estimated, there is no need for a vacuum servo negative pressure sensor and costs can be reduced.

(2) The negative pressure estimation unit 42 makes a detection based on a value obtained by subtracting the atmospheric pressure from the pressure inside the intake manifold 10. Consequently, the negative pressure inside the vacuum servo 3 can be estimated by a simple calculation.

(3) The predetermined condition also includes cases in which the brake pedal 4 is pressed, the engine 1 is idling, and the vehicle is traveling. Consequently, traveling states that require negative pressure to be ensured can be detected with precision.

Other Examples

The present invention was described above based on an example, but the specific configuration may be embodied in other configurations. In the first embodiment, the negative pressure inside the vacuum servo 3 is calculated by estimation, but a sensor can be provided and the negative pressure can be directly detected. Even when the brake pedal 4 is OFF, and even in cases in which there is a history of the brake pedal 4 being ON during the second predetermined time T2 or cases in which the engine 1 is not idling, the control described above can be applied when negative pressure is insufficient.

The invention claimed is:

1. A control method for controlling air-conditioning of a vehicle, the control method comprising:
   providing an air-conditioning compressor driven by an internal combustion engine;
   providing a negative pressure estimation unit that estimates a negative pressure, which is generated in an intake passage of the internal combustion engine by a vacuum servo that assists a brake pedal force, based on an atmospheric pressure and a pressure inside the intake passage; and
   when a predetermined condition is established that includes a state in which the estimated negative pressure inside the vacuum servo is insufficient relative to a predetermined pressure during operation of the air-conditioning compressor, a state in which the brake pedal is pressed and the engine is idling, and a state in which the vehicle traveling, stopping the air-conditioning compressor during a first time period, operating the air-conditioning compressor during a second time period regardless of the predetermined condition after the first time period has elapsed, and controlling operation of the air-conditioning compressor in accordance with the established state of the predetermined condition after the second time period has elapsed.

2. The control method according to claim 1, wherein the negative pressure estimation unit is further configured to estimate the negative pressure inside the vacuum servo based on a value obtained by subtracting the atmospheric pressure from the pressure inside the intake passage.

3. A vehicle air-conditioning device for a vehicle, the vehicle air-conditioning device comprising:
   an air-conditioning compressor driven by an internal combustion engine;
   a negative pressure estimation unit that estimates a negative pressure, which is generated in an intake passage of the internal combustion engine by a vacuum servo that assists a brake pedal force, based on an atmospheric pressure and a pressure inside the intake passage; and
   a controller that controls operation of the air-conditioning compressor such that when a predetermined condition is established that includes a state in which the estimated negative pressure inside the vacuum servo is insufficient relative to a predetermined pressure during operation of the air-conditioning compressor, a state in which the brake pedal is pressed and the engine is idling, and a state in which the vehicle traveling, the air-conditioning compressor is stopped during a first time period, the air-conditioning compressor is operated during a second time period regardless of the predetermined condition after the first time period has elapsed, and operation of the air-conditioning compressor is controlled in accordance with the states of the predetermined condition being established after the second time period has elapsed.

\* \* \* \* \*